Figure 1:
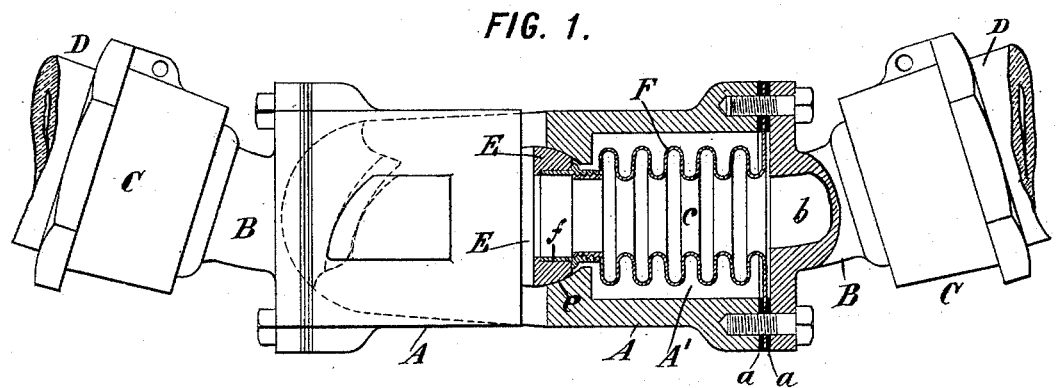

(No Model.)

F. W. WRIGHT.
HOSE COUPLING.

No. 485,729. Patented Nov. 8, 1892.

WITNESSES:
John Becker
Fred White

INVENTOR:
Frederic W. Wright,
By his Attorneys,
Arthur C. Fraser & Co.

UNITED STATES PATENT OFFICE.

FREDERIC W. WRIGHT, OF GREAT NECK, NEW YORK.

HOSE-COUPLING.

SPECIFICATION forming part of Letters Patent No. 485,729, dated November 8, 1892.

Application filed February 23, 1892. Serial No. 422,360. (No model.)

*To all whom it may concern:*

Be it known that I, FREDERIC W. WRIGHT, a citizen of the United Statas, residing at Great Neck, in the county of Queens and State of New York, have invented certain new and useful Improvements in Hose-Couplings, of which the following is a specification.

This invention relates to couplings for uniting sections of hose or other pipe together, being especially designed for coupling together the terminal hose-lengths of steam-heating pipes of railway-cars, although applicable also to other purposes.

Couplings are now made comprising two heads adapted to lock together by a tilting or oscillating movement and having tilting seats socketed in the coupling-heads and adapted by a movement in their sockets to compensate or adapt themselves to one another as the heads are locked together. Such seats are preferably made as rings of suitable seating material, the outer surfaces of which are formed as segments of spheres and seated in segmento-spherical sockets in the meeting ends or sides of the heads. Such compensating seats have the advantage of making a tighter joint at their junction with one another than can be ordinarily effected with seats that are not compensating; but they are subject to the disadvantage that two additional joints are formed—namely, at the rear sides of the rings where they are seated in the sockets in the heads. Some leakage of steam or other fluid is liable to occur through these two additional joints, which in part neutralizes the advantage of the compensating seats.

The object of my invention is to provide compensating seats with means for preventing any leakage between them and the heads to which they belong, so that in a complete coupling with compensating seats there will be only one joint—namely, that at the junction of the respective seats with each other. To this end I employ compensating seats suitably seated or socketed in the heads, and I connect these seats at one end of a flexible tubular diaphragm or other flexible tube, the opposite end of which communicates with the outlet from the head, this outlet being usually formed through the neck for connecting with the hose. This flexible connection is prefer- ably made of a tube of metal so deeply corrugated as to form a succession of diaphragms. Such a tube affords considerable flexibility and is also capable of being somewhat elongated or contracted. Other forms of flexible connection may, however, be used instead.

Figure 2:
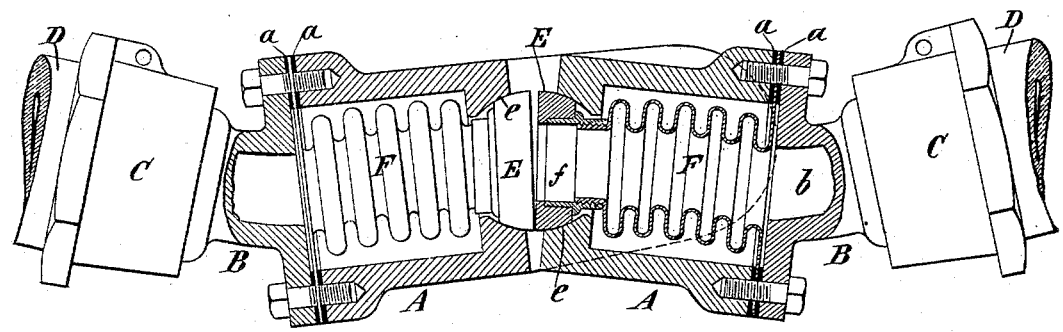
Figure 3:
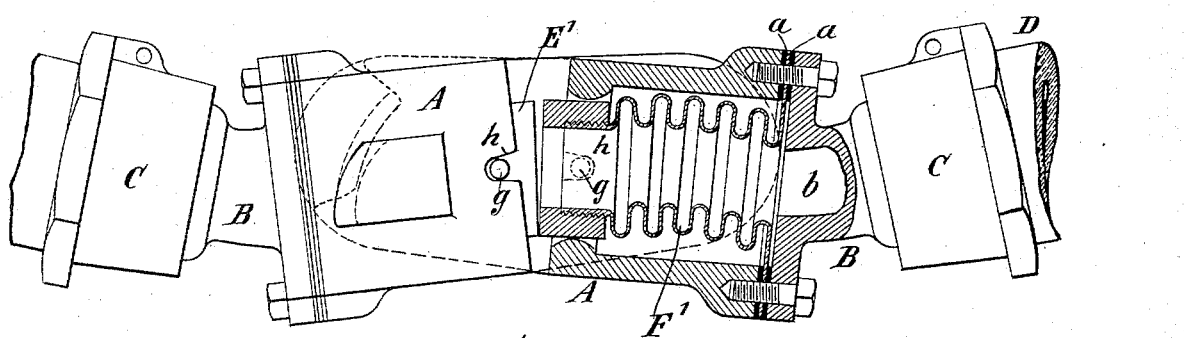
Figure 4:
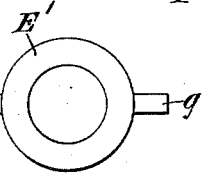

Figure 1 of the accompanying drawings is a side elevation of a pair of coupling-heads to which my invention is applied coupled together, one of the heads being in vertical mid-section. Fig. 2 is a similar view in section through both heads and showing them in the act of coming together. Fig. 3 is a sectional elevation similar to Fig. 1, but showing a modified construction. Fig. 4 is an elevation of the seat in Fig. 3 detached.

The drawings show a coupler of the class known as a "straight-port" or "direct-port" coupling, as distinguished from one having lateral ports. The particular type of coupling device shown is that wherein each head has a locking projection or lug on one side and a locking-arm projecting forward from its opposite side and having an inward projection adapted to engage and wedge against the projection on the side of the reciprocal head, so that the two heads are locked together by a tilting movement, the locking faces of the respective projections being relatively eccentric, so that as the heads are tilted to the position of alignment they are forced endwise toward each other to wedge them tightly together. The particular means for locking the two heads together, however, is immaterial to my invention.

Let A A designate the respective coupling-heads having necks B B united by any suitable union C to the hose D or to the terminal section of an articulated or otherwise flexible pipe, all of which may be constructed in any usual, known, or suitable manner.

Referring to Figs. 1 and 2, the seat E is a ring of suitable material, which is itself seated in a socket *e*, formed in the outer or meeting end of the coupling-head, the outer surface of the ring and the surface of the socket being segments of a sphere in order that the ring may have a universal tilting motion in the socket. Within the ring is preferably constructed a thimble *f*, which projects backwardly through the opening into the interior of the coupling-head. Within the head is a flexible tube or tubular diaphragm F, the outer end of which is connected to the seat E, preferably by screwing into the thimble *f*, or in any other suitable manner, while the outer end of the tube is connected to the outer or rear end of the head in any suitable way, preferably by clamping it between two parts of the head, as clearly shown, packing washers or lutings *a a* being interposed to make a steam-tight joint. The steam-passage *b* through the neck B, and which communicates with the passage through the hose, admits the steam into the inner passage *c* through the tubular diaphragm F, and it thence passes through the annular seat and in like manner into and through the passage of the head. The flexible tube F thus constitutes a portion of the steam passage or duct, so that steam is not admitted into the inner chamber A' of the coupling-head, and consequently cannot escape through the space between the seating-ring E and its socket *e*, as in the constructions heretofore devised. The socket-bearing of the seating-ring consequently becomes a mere mechanical rest or abutment for the seat instead of being, as heretofore, a necessarily-steam-tight joint.

As the couplings are brought together with a tilting motion the lower edges of the respective seats are the first to meet, and they consequently displace each other by a mutual tilting in their sockets, and this movement is permitted by the flexure of the tubular diaphragm F, which is bowed upwardly, as shown in Fig. 2. As the couplings come fully together the seats should assume a perpendicular position, as shown in Fig. 1; but in case either seat is worn the other or both will assume a position to compensate therefor and bring the seating faces into close contact. The flexibility of the tube F admits of any such compensating movement of the seats, the tube being correspondingly bowed or distorted.

It is not essential that the seating-ring shall be closely socketed or seated back against the socket in the head in the manner shown in Figs. 1 and 2, as it may pass freely through an opening in the head, being merely provided with stops to limit its backward movement and enable the thrusts of the heads in being forced toward each other to engage and force the respective seats toward each other. This construction is shown in Fig. 3, where each of the seats has a cylindrical ring E' formed with opposite pivots or trunnions *g g*, as shown in Fig. 4. The meeting ends of the heads are formed with openings through which the seats may freely pass and have a certain degree of rocking or angular movement therein, while on opposite sides are formed notches *h h* to receive the pivots *g g*. As the heads are tilted together and brought to the locked position the bottoms of the notches engage the pivots *g*, and through them press the two seats together. When unlocked, the elasticity of the diaphragmatic tube F, (here lettered F') may thrust out the seats somewhat, so that their pivots *g* shall not rest against the bottoms of the notches *h*; but in the act of locking the couplings the seats will be pressed back and their pivots seated against the bottom of the notches or pivotal sockets. These sockets thus form rocking bearings for the seats, enabling them to compensate completely in up-and-down direction, but only imperfectly in lateral direction. This, however, is not a serious imperfection, since the principal wear upon the seats which has to be compensated for occurs at the bottoms.

I claim as my invention the following-defined novel features, substantially as hereinbefore specified, namely:

1. A coupling the heads of which have compensating seats seated against them and a flexible or yielding connection between said seat and the outlet from the head, whereby the inclosed fluid is confined within said connection and cannot escape between the seat and head.

2. A coupling the heads of which are formed each with a socket, a compensating seat seated in said socket, and a flexible or yielding connection between said seat and the outlet from the head, whereby the inclosed fluid is confined within said connection and cannot escape between said seat and head.

3. A coupling the heads of which are locked together by a tilting motion, each being formed with a spherical socket having a compensating seat consisting of a spherical segment seated in the socket, and a flexible tubular connection between said seat and the outlet from the head, adapted to be bowed by the tilting or compensating movement of the seat.

4. In a coupling, the combination, with the head A thereof, of a compensating seat E and a diaphragmatic flexible tube F, connected at one end to said seat and communicating at the other with the outlet from the head.

In witness whereof I have hereunto signed my name in the presence of two subscribing witnesses.

FREDERIC W. WRIGHT.

Witnesses:
GEORGE H. FRASER,
CHARLES K. FRASER.